3,017,394
PROCESS FOR THE POLYCONDENSATION OF DIAMINES AND DICARBOXYLIC ACIDS

Werner Muench, Cesano Maderno, Luigi Notarbartolo, Milan, and Giuseppe Messina, Limbiate, Italy, assignors to Snia Viscosa Società Nazionale Industria Applicazioni Viscosa S.p.A., Milan, Italy
No Drawing. Filed Aug. 25, 1958, Ser. No. 757,126
Claims priority, application Italy Aug. 28, 1957
3 Claims. (Cl. 260—78)

This invention relates to a novel method for the polycondensation of salts of dicarboxylic acids with diamines.

According to the conventional procedure the polycondensation of these salts is generally effected by progressively heating an aqueous solution of these salts up to a temperature above the melting point of the polycondensate and by progressively removing the water by evaporation. Generally the water is removed initially under pressure and then at atmospheric pressure, and eventually the remaining traces are removed under vacuum. By this process not only the water formed by the polycondensation reaction is removed but also the excess water which had been utilized to obtain the solution of the salt.

By this process generally a part of the diamine that is one of the components of the salt is lost, entrained by the steam, and the quantity of diamine which is lost with the steam is so much the greater the greater is the vapour pressure of the diamine itself and the greater is the dilution of the salt in the water.

The majority of the diamines which are utilized in the production of the polyamides is furthermore responsive to the effect of the water the more so the higher is the temperature. Secondary amines are thought to be formed from the diamines, with proportional loss of ammonia.

The presence of secondary amines even in traces in the final polymer is generally undesirable as they originate cross-links which depreciate the stress-strain and drawing characteristics of the polyamides which eventually produce fibres or shaped articles of inferior characteristics.

It has now been found that all these difficulties can be overcome if the polycondensation of the salts of dicarboxylic acids and diamines is performed in an organic liquid medium formed either by biphenyl, or biphenyl oxide or by the azeotropic mixture consisting of 73.5% biphenyl oxide and 25.5% biphenyl.

The novel process may be performed either as a single or two stage process.

In either case, the salt of the dicarboxylic acid and diamine is converted into a precondensate by progressively heating a suspension of the salt in the organic liquid up to a temperature generally above the melting point of the polymer. During the heating, which is generally effected in the presence of a protecting inert gas, the water of the condensation reaction is removed and the heating is protracted until such time as virtually no more water is distilled. The salt at this point has been converted into the molten precondensate.

According to the single-stage process, at this point the distillation of the organic liquid under vacuum is performed and in this case the polycondensation of the salt with the removal of the last traces of water is simultaneously completed. A stream of inert gas in the molten mass may facilitate the polycondensation and it may also facilitate the removal of the last traces of the organic liquid used.

According to the two-stage process the organic liquid is separated from the polymeric precondensate and the separation can be effected in hot condition by separating the two layers by decantation; or in the cold, by mechanically separating the organic liquid from the solid precondensate; or, still in the cold, by removing the organic liquid by means of solvents susceptible of a subsequent easy removal.

At any rate, the polycondensation of the precondensate is subsequently continued in the molten state up to the removal of the last of the reaction water either at atmospheric pressure or under vacuum. Also in this case the completion of the polycondensation and the possible removal of traces of organic liquid can be accelerated by a stream of inert gas through the molten polymer.

The two-stage process exhibits, as compared with the single-stage process, the advantage of requiring no heat expenditure in order to distil the additional organic liquid. This method could also afford the opportunity to carry out more easily a continuous process.

The results of either process are however virtually equally favorable and in either case very good polymerization having regular and reproducible viscosities are obtained.

In the performance of the polycondensation according to the novel method all those additions known per se can be made, which are within the purview of those skilled in the art, that is, additions of stabilizers for adjusting the viscosity, plasticizers, matting agents such as titanium dioxide and pigments in general, adapted to give a mass-colored polymer.

The examples reported hereinafter will give a more detailed picture of the process according to the invention. Although in these examples only the salt of meta-xylylene diamine and hexamethylene diamine are disclosed, an aromatic diamine and an aliphatic diamine respectively, with adipic and sebacic acids, the invention can be favorably applied to all those salts of diamines and dicarboxylic acids which by the conventional process in aqueous solution display a volatility and instability of the diamine, the consequences whereof those skilled in the art can easily understand.

Example 1

30 gms. of meta-xylylene diamine adipate, 20 gms. biphenyl oxide and 0.3 gm. stearic acid are charged into a test tube 35 cms. in length and of a diameter of 3 cms. equipped with a large side charging tube and a short tube for the introduction of gas. The test tube is then heated in a metal block up to a temperature of 235–240° C. while constantly maintaining within the tube a slight hydrogen pressure. After a short time the mass starts to melt, while simultaneously water distills which is condensed by means of a condenser and is collected in the appropriate vessel. After one hour the mass is molten and clear and has split into two layers 3.7 cu. cms. of the calculated amount of water of 3.83 cu. cms. are distilled. These, show after titration with 0.1 N $H_2SO_4$ only traces of amine.

The temperature of the block is now brought in 15 minutes to 270° C. maintaining it for additional 10 minutes at this value. The prepolymerisate thus obtained is cooled under hydrogen and the mass is removed from the test-tube and is then triturated.

A small sample is washed with xylene for the determination of the viscosity in order to remove the remainders of biphenyl oxide which have remained adhering to the surface and is then dried.

The viscosity is then determined in meta-cresol according to Carothers. An intrinsic viscosity of 0.60 has been found in this sample.

The mass is molten in 15 minutes for the final polymerization in a test-tube of the same size, whose gas intake tube has been however prolonged to reach the bottom and subsequently condensed for 40–45 minutes at a temperature of the metal block of 275° C. During all the time of processing a slight hydrogen stream is introduced through the capillary in the tube and is bubbled through the molten mass.

The mass is then allowed to cool under hydrogen, washed and dried as before and the intrinsic viscosity which is now 0.99 is again determined.

Example 2

The polymerization of the meta-xylylene diamine sebacate is essentially the same as that of the adipate.

45 gms. of meta-xylylene diamine sebacate, 0.4 gm. stearic acid, and 30 gms. eutectic mixture of 73.5 gms. biphenyl oxide and 26.5 gms. biphenyl are prepolymerized in the same apparatus as described in Example 1. For this purpose the temperature of the block is initially maintained for 1 hour and 10 minutes at 225–230° C., after which the separation of the water is virtually completed. The apparatus is now slowly brought under vacuum without discontinuing polymerization so that the organic liquid may distill without so much as the polymerizate left in the apparatus solidifying due to the evaporation heat yielded. As all the organic liquid has been distilled the external temperature is brought to 265° C. still maintaining for 1 hour an absolute pressure of 13 mm. of mercury. The polymer is then allowed to cool avoiding the entrance of air.

The intrinsic viscosity was 0.98.

Example 3

30 gms. hexamethylene diamine adipate are covered with 20 gms. pure biphenyl oxide and the whole mass is pre-polymerized as described in Example 1. In the first stage of the polymerization the mixture is left for 50 minutes in a block heated at 225° C. During this time the larger fraction of the water formed throughout the reaction evaporates together with traces of biphenyl oxide so that in the collecting vessel 2.5 cu. cms. of water are found.

The temperature of the block is then brought to 270° C. and the mixture is allowed to stand for additional 90 minutes in the block.

The polymerization is completed under slight vacuum in 50 minutes at the same temperature.

The intrinsic viscosity of the finished polymerizate, as measured in meta cresol, is 1.03.

Example 4

30 gms. hexamethylene diamine sebacate, 0.2 gm. acetic acid, and 0.6 gm. of a 20% aqueous suspension of $TiO_2$ are admixed with 30 gms. of biphenyl. Polycondensation is performed by using the equipment of Example 1, bringing the temperature of the block at 235–240° C. for 2 hours, after which the separation of the water is completed. Only traces of amine are found in the condensate. Now the equipment is brought under vacuum and the biphenyl is distilled bringing the temperature progressively to 265° C. and the vacuum to a residual pressure of 10 mms. of mercury. It is then kept for 2 hours under these conditions by introducing a slight stream of nitrogen into the pure polymer. The polymer is then allowed to cool bringing the equipment to atmospheric pressure with nitrogen.

The intrinsic viscosity of the polymer was found to be 1.05.

We claim:

1. A process for the polycondensation of a salt of a dicarboxylic acid selected from the group consisting of adipic and sebacic and a diamine selected from the group consisting of metaxylylene diamine and hexamethylene diamine, comprising the steps of heating the said salts in the presence of a non-solvent organic liquid chosen from the group consisting of biphenyl oxide and mixtures of biphenyl and biphenyl oxide, removing from the reaction mass the water formed in the reaction by distillation while leaving the portion of the said organic liquid not carried over with water, then distilling off the organic liquid, and thereafter completing the polycondensation at a higher temperature.

2. A process according to claim 1, comprising completing the distillation of the organic liquid by heating under a vacuum.

3. A process according to claim 1, wherein the organic liquid is a mixture of biphenyl and biphenyl oxide consisting of 26.5% by weight of diphenyl and 63.5% of diphenyl oxide.

References Cited in the file of this patent

UNITED STATES PATENTS

| | | |
|---|---|---|
| 2,190,770 | Carothers | Feb. 20, 1940 |
| 2,597,643 | Izard et al. | May 20, 1952 |
| 2,756,221 | Caldwell | July 24, 1956 |
| 2,847,397 | Kleine et al. | Aug. 12, 1958 |